(12) United States Patent
Khodabakhsh

(10) Patent No.: US 9,315,907 B2
(45) Date of Patent: Apr. 19, 2016

(54) GAS COLLECTION DEVICE AND METHOD FOR USE THEREOF

(76) Inventor: Mohammed Khodabakhsh, Upland, CA (US)

( * ) Notice: Subject to any disclaimer, the term of this patent is extended or adjusted under 35 U.S.C. 154(b) by 852 days.

(21) Appl. No.: 12/271,730

(22) Filed: Nov. 14, 2008

(65) Prior Publication Data

US 2010/0122914 A1    May 20, 2010

(51) Int. Cl.
*C25B 1/04* (2006.01)
*C25B 9/08* (2006.01)

(52) U.S. Cl.
CPC ........................................ *C25B 1/04* (2013.01)

(58) Field of Classification Search
USPC .......................................... 205/628; 204/260
See application file for complete search history.

(56) References Cited

U.S. PATENT DOCUMENTS

| 487,996 A | 12/1892 | Cranny |
| 1,477,629 A | 5/1921 | Chrisman |
| 2,204,982 A | 9/1936 | Dahling |
| 3,236,692 A | 2/1966 | Lewis |
| 4,178,224 A | 12/1979 | Porter |
| 6,086,733 A * | 7/2000 | Carey et al. ................... 204/242 |
| 7,909,979 B2 * | 3/2011 | Yamada et al. ................ 205/340 |
| 2001/0050234 A1* | 12/2001 | Shiepe .......................... 205/629 |
| 2002/0108866 A1* | 8/2002 | Bonilla Griz .................. 205/637 |
| 2005/0189234 A1* | 9/2005 | Gibson et al. ................. 205/337 |
| 2005/0217991 A1* | 10/2005 | Dahlquist, Jr. ................ 204/267 |
| 2008/0257751 A1* | 10/2008 | Smola et al. .................. 205/628 |
| 2010/0140080 A1* | 6/2010 | Daly et al. .................... 204/260 |

FOREIGN PATENT DOCUMENTS

FR            2286891 A  *  6/1976

* cited by examiner

*Primary Examiner* — Nicholas A Smith
(74) *Attorney, Agent, or Firm* — Eric B. Alspaugh

(57) ABSTRACT

An apparatus for collecting electrolytically formed gasses and a method for using the same are presented. A gas collection device comprises an inner vessel having an electrically conductive surface portion for allowing the electrolytic formation of a first gas; an outer vessel having an electrically conductive surface portion for allowing the electrolytic formation of a second gas; and a capture member for capturing one of the formed gasses; wherein: the inner vessel is disposed substantially within the outer vessel; both vessels are configured to allow a continuous fluid body to come into contact with the conductive surface portions; and the capture member allows the capture of one of the formed gasses without substantial contamination from the other formed gas.

22 Claims, 8 Drawing Sheets

GAS COLLECTION DEVICE AND METHOD FOR USE THEREOF

TECHNICAL FIELD

The present invention relates to electrolytic devices, and more particularly, some embodiments relate to apparatuses for electrolysis and for the collection of gasses resulting from the electrolysis of water.

DESCRIPTION OF THE RELATED ART

Electrolysis of water to form hydrogen and oxygen gas is well known in the art. The gasses produced by this process may be used for a variety of different purposes. For example, hydrogen may be injected into a car engine's air intake manifold to increase fuel consumption efficiency and reduce harmful emissions.

Electrolysis devices generally comprise at least a vessel for holding water and two electrodes in the water, an anode and a cathode. A DC current is passed between the electrodes through the water. Hydrogen gas forms at the negatively charged cathode through a reduction reaction. Oxygen gas forms at the positively charged anode through an oxidation reaction.

Often, the formed gasses are difficult to keep separate in the electrolysis device, and Brown's gas, a mixture of hydrogen gas and oxygen gas, is produced and collected. Devices that avoid the production of Brown's gas often comprise on efficiency by having entirely separate containment vessels for the anode and cathode.

Electrolysis efficiency varies widely depending on whether there are impurities in the water. Electrolyzing pure water quickly causes an accumulation of aqueous dissolved positively charged hydrogen cations at the anode and aqueous dissolved negatively charged hydroxide anions at the cathode. This accumulation impedes the flow of electricity, preventing further formation of hydrogen and oxygen gas until the ions can slowly diffuse away. Impurities such as those found in ordinary tap water can mitigate this accumulation; however, care must be taken in choosing an impurity. For example, if sodium chloride (ordinary table salt) is used as an impurity, toxic chlorine gas will form at the anode instead of oxygen.

Electrolysis devices often fail to quickly collect the gasses formed at the electrodes. The oxygen and hydrogen gasses may remain dissolved in the water. Degasification methods, such as forcing liquid through porous membranes, heating the liquid, or lowering the pressure, decrease efficiency by using further energy.

It is also well known that increasing the pressure of the water may facilitate the electrolytic reaction. However, increasing the pressure of the water also increases the amount of hydrogen and oxygen gas that may remain dissolved in the water. Devices that attempt to utilize the benefit of increased pressure in electrolysis can face difficulties in keeping water under high pressure and increased need to degasify.

BRIEF SUMMARY OF EMBODIMENTS OF THE INVENTION

According to various embodiments of the invention, electrolytically formed gasses may be captured and contained in gas capture cells. The gas capture cells may comprise substantially cylindrical concentric vessels, a membrane disposed between the vessels, and capture members disposed to capture and contain gasses electrolytically formed at the perimeter surfaces of the concentric vessels. The vessels are configured to receive a charge to perform electrolysis. When the vessels are properly charged, gasses form in the spaces between the vessels and the membrane. The gas formed in the inner space is captured in an inner capture member. The gas formed in the outer space is captured in an outer capture member. Multiple gas capture cells may be joined to form multiple cell configurations. The corresponding capture members of the multiple gas capture cells may be joined with pipes or tubes or, alternatively, the outer capture members may be joined to form one large outer capture member.

According to an embodiment of the invention, a conductive inner vessel is disposed substantially within a conductive outer vessel. The vessels allow the electrolytic formation of a first and second gas. A capture member is disposed to capture one of the two gasses.

According to a further embodiment of the invention, a membrane is disposed substantially between the inner and outer vessels. The capture member is joined to the membrane and captures the first gas formed at a surface of the inner vessel.

According to another embodiment of the invention, an inner vessel is disposed substantially within an outer vessel. The vessels are charged to electrolytically form two gasses. A capture member captures one formed gas.

According to a further embodiment of the invention, a membrane is disposed between the inner and outer vessels. The capture member captures the gas formed in the space between the inner vessel and the membrane.

According to another embodiment of the invention, a plurality of inner vessels are disposed within a plurality of corresponding outer vessels. The vessels enable the electrolytic formation of two gasses. A plurality of capture members capture one of the gasses. The plurality of capture members are coupled to allow the transfer of the captured gasses among the members.

According to a further embodiment of the invention, a plurality of membranes are disposed between corresponding inner and outer vessels. The plurality of capture members are joined with the membranes to allow the capture of the gas formed in the space between the inner vessel and the membrane.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1 represents an example gas collection cell.

The figures are not intended to be exhaustive or to limit the invention to the precise form disclosed. It should be understood that the invention can be practiced with modification and alteration, and that the invention is limited only by the claims and the equivalents thereof.

DETAILED DESCRIPTION OF THE EMBODIMENTS OF THE INVENTION

The present invention is directed toward a method and apparatus for gas collection. In one embodiment, a substantially cylindrical inner vessel is concentrically disposed substantially within a substantially cylindrical outer vessel. An impermeable, nonconductive cylindrical membrane is disposed equidistantly between the inner and outer vessel. An inner capture member—which captures a first gas electrolytically formed at the surface of the inner vessel—is joined to the upper portion of the membrane. An outer capture member—which captures a second gas electrolytically formed at the surface of the outer vessel—is joined to the upper portion of the outer vessel.

Before describing the invention in detail, it is useful to describe an example environment in which the invention can be implemented. One such example is that of collecting hydrogen for injection into a combustion engine. Hydrogen may be injected into the air intake manifold of a combustion engine to increase engine efficiency. The inventive apparatus may be used to collect hydrogen from electrolysis for this injection.

From time-to-time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 1:
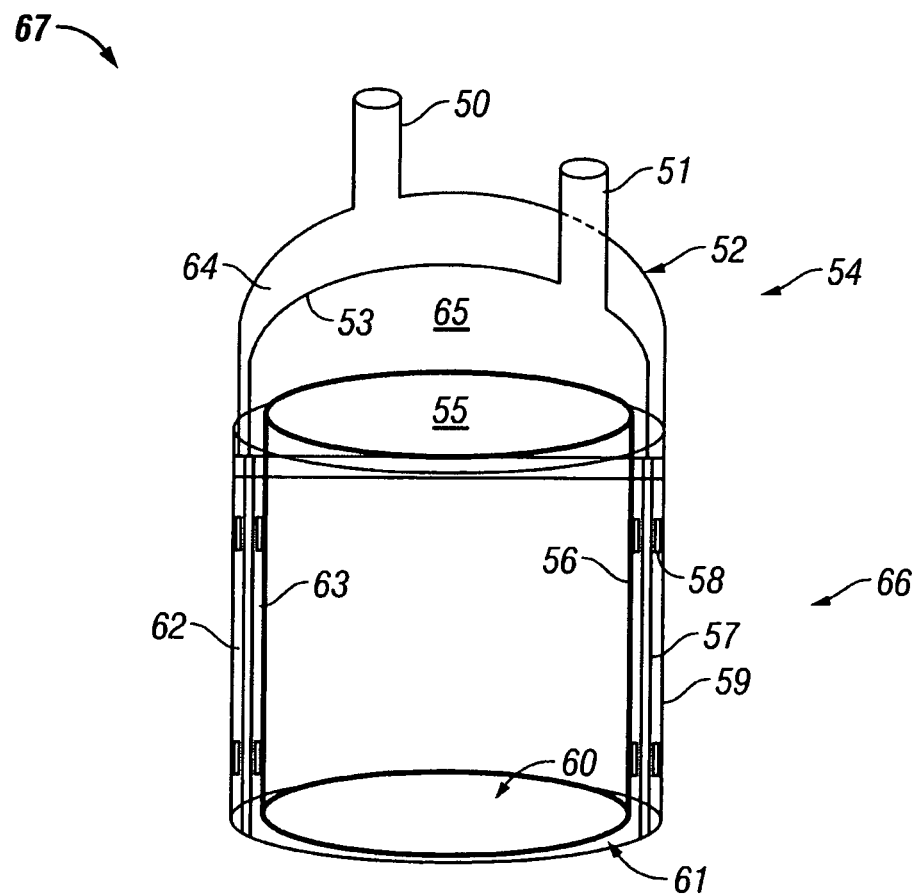

Referring now to FIG. 1, in one example, a gas collection cell 67 may comprise a cap 54 and a separation vessel 67. Cap 54 may be configured to capture gasses produced in separation vessel 67. Cap 54 may comprise an outer capture member 52 and an inner capture member 53. Separation vessel 67 may comprise: (i) an outer vessel 59; (ii) an inner vessel 56; (iii) a membrane 57; and (iv) a set of separators 58. In various examples, the gas collection cell may be disposed substantially within a body of electrolysis fluid. In other examples, electrolysis fluid may be contained within the inner capture member or may be externally introduced. In further examples, the inner and outer vessels are charged as an anode and cathode, fluid is introduced into the spaces surrounding the vessels and is electrolyzed to form a gas at the anode and a gas at the cathode. The formed gasses are collected in the inner and outer capture member, respectively. Those of ordinary skill in the art would understand various methods for introducing an electrolysis fluid to the vessels without departing from the scope of the present invention.

In various examples, separation vessel 67 comprises an inner vessel 56 disposed substantially within outer vessel 59 and membrane 57. Inner vessel 56 may be configured to hold a charge to allow the electrolytic liberation of a gas in the inner separation space 63 between the inner vessel 56 and the membrane 57. In various examples, inner vessel 56 may be composed of a conductive material or it may have a conductive coating disposed on its outer circumference. In other examples, inner vessel 56 may be largely nonconductive, and only a portion of the inner or outer surface may be coated with a conductive coating. In a particular example, inner vessel 56 may be a stainless steel cylindrical vessel. In a further example, inner vessel 56 is a cylindrical vessel approximately 2.54 cm (1 inch) in diameter and 10.16 cm (4 inch) in height. Or, in another example, inner vessel 56 may be a polycarbonate cylindrical vessel coated with a layer of stainless steel. In these examples, stainless steel may serve to resist corrosion during electrolysis; however, other materials may be chosen that do or do not resist corrosion. Those of ordinary skill in the art would recognize other suitable compositions of the inner vessel without departing from the scope of the invention.

In various examples, separation vessel 67 further comprises a membrane 57 disposed between inner vessel 56 and outer vessel 59. Membrane 57 may be kept substantially positionally stable by a series of separators 58 disposed on the outer surface of the inner vessel 56 and the inner surface of the outer vessel 59. Membrane 57 may serve to separate inner separation space 63 from outer separation space 62. In particular examples, membrane 57 and separators 58 are composed of an impermeable, nonconductive material. In these examples, the impermeability of membrane 57 prevents the transfer of formed gasses between inner separation space 63 and outer separation space 62. The nonconductivity of membrane 57 and separators 58 prevent them from receiving an induced charge, which might allow the formation of a contaminating gas in the separation spaces. Membrane 57 may be configured so that the bottom portion allows for fluid communication between spaces 63 and 62. When the inner vessel and the outer vessel are charged, this communication enables electrolysis by allowing current to pass between the two charged vessels. In a particular example, the impermeability of the membrane prevents oxygen gas formed in the outer separation space from contaminating hydrogen gas formed in the inner separation space. The nonconductivity of the membrane prevents the inner surface of the membrane from receiving an induced positive charge, thus preventing the formation of oxygen within the inner separation space. In a particular example, three separators are disposed equidistantly around the outside perimeter of a cylindrical inner vessel, each separator formed into a square prism with dimensions approximately 2 mm×2 mm×10.16 cm. Three corresponding separators are disposed equidistantly around the inside perimeter of a cylindrical outer vessel. Membrane 57 is formed into a cylindrical tube with a wall of approximately 0.7 mm and is held in place equidistantly between the inner and outer vessels by the separators. Those of ordinary skill in the art would recognize that conductive or permeable materials might be used for the membrane depending on the desired application of the gas collection cell without departing from the scope of the invention.

Referring still to FIG. 1, in various examples, separation vessel 67 further comprises an outer vessel 59 disposed substantially around membrane 57 and inner vessel 56. In a particular example, the outer vessel is a cylindrical vessel with a diameter of approximately 3.2 cm and a height of approximately 10 cm. Outer vessel 59 is configured to hold a charge to allow the electrolytic liberation of a gas in the outer separation space 62 between the outer vessel 59 and the membrane 57. In various examples, outer vessel 59 may be composed of a conductive material or it may have a conductive coating disposed on its inner circumference. In other examples, outer vessel 59 may be largely nonconductive, and only a portion of the inner or outer surface of the outer vessel may be coated with a conductive coating. In a particular example, outer vessel 59 may be a stainless steel cylindrical vessel. Or, in another example, outer vessel 59 may be a polycarbonate cylindrical vessel coated with a layer of stainless steel. In these examples, stainless steel may serve to resist corrosion; however, one may choose other suitable materials that resist corrosion during electrolysis. Those of ordinary skill in the art would recognize other suitable compositions of the outer vessel without departing from the scope of the invention.

Referring still to FIG. 1, the cap 54 is disposed on top of the separation vessel 67 and configured to capture gasses produced in the separation vessel. In various examples, the cap 54 comprises an inner capture member 53 disposed substantially within an outer capture member 52. Inner capture member 53 is configured to capture gas in the inner capture space 65 that is electrolytically produced in the inner separation space 63. In the illustrative example, the substantially cylindrical bottom rim of the inner capture member 53 is joined with the substantially cylindrical upper rim of the membrane 57. Thus, gas produced in the inner separation space 63 accumulates in the inner capture space 65. Inner capture member 53 may be composed of a variety of materials. For example, it could be composed of a polycarbonate plastic, or it could be a metal such as stainless steel. In various examples, inner capture member 53 may be glued or fused to membrane 57. In other examples, inner capture member 53 and membrane 57 may comprise one melded component. Those of ordinary skill in the art would recognize other configurations for joining the inner capture member to the membrane without departing from the scope of the present invention.

Referring still to FIG. 1, inner capture member 53 further comprises inner outlet member 51. Inner outlet member 51 may be configured to allow the output of gas contained in inner capture space 65. In various examples, the inner outlet member 53 may be formed into a tube or pipe that exits the inner capture member and travels through the outer capture space 64 and further travels through the outer capture member 52. In various examples, inner outlet port may be formed or molded as a single piece with the inner capture member. In other examples, the inner outlet member may be a separate component inserted into the inner capture member. Those of ordinary skill in the art would understand further methods for allowing the release of gas contained in the inner capture space without departing from the scope of the invention.

Referring still to FIG. 1, the cap 54 may further comprise an outer capture member 52 disposed substantially around the inner capture member 53. Outer capture member 52 is configured to capture gases in the outer capture space 64 that are produced in the outer separation space 62. In the illustrative example, the substantially cylindrical bottom rim of the outer capture member 52 is joined with the substantially cylindrical upper rim of the outer vessel 59. Thus, gasses produced in the outer separation space 62 accumulate in the outer capture space 64. Outer capture member 52 may be composed of a variety of materials. For example, it could be composed of a polycarbonate plastic, or it could be a metal such as stainless steel. In various examples, outer capture member 52 may be glued or fused to outer vessel 59. In other examples, outer capture member 52 and outer vessel 59 may comprise one melded component.

Referring still to FIG. 1, outer capture member 52 further comprises outer outlet member 50. Outer outlet member 50 may be configured to allow the output of gas contained in outer capture space 64. In various examples, the outer outlet member may be formed into a tube or pipe that exits the outer capture member. In various other examples, outer outlet port may be formed or molded as a single piece with the outer capture member. In other examples, outer outlet port may be a separate piece inserted into the outer capture member. Those of ordinary skill in the art would understand further methods for allowing the release of gas contained in the outer capture space without departing from the scope of the invention.

Referring still to FIG. 1, it may be helpful to describe an illustrative example electrolytic reaction taking place in gas collection cell 67. In this example, normal tap water contained in an inner reservoir 55 is in fluid communication with inner separation space 63 and outer separation space 62 through spaces 60 and 61. Water flows from the inner reservoir into the inner and outer separation spaces. Then, inner vessel 56 is negatively charged as a cathode and outer vessel 59 is positively charged as an anode, with the voltage difference allowing for the electrolytic separation of the water into hydrogen and oxygen gas. The electrolytic separation of the water into hydrogen and oxygen gasses occurs when current flows through the water contained in the two separation spaces. The electrolytically formed hydrogen gas accumulates in the inner separation space 63 adjacent to the cathode 56. This hydrogen gas is prevented from entering the outer separation space 62 by the membrane 57. Oxygen is not produced in the inner separation space 63 because the membrane 57 is nonconductive. In this example, the electrolytically formed oxygen gas accumulates in the outer separation space 62 adjacent to the anode 59. The oxygen gas is prevented from entering the inner separation space by the membrane 57. Hydrogen gas is not formed in the outer separation space because the membrane is nonconductive. After the hydrogen and oxygen gasses are produced, they bubble up through the water and accumulate in the inner capture space 65 and the outer capture space 64, respectively. The hydrogen and oxygen gasses contained in the inner and outer capture spaces are then released through the inner and outer outlet ports 51 and 50, respectively.

Figure 2:
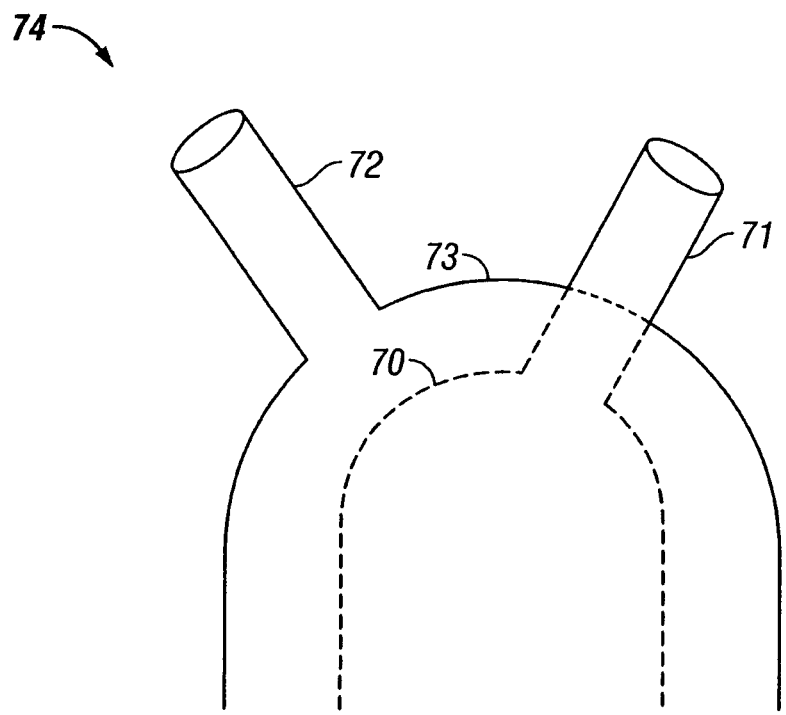
FIG. 2 represents a see-through illustration of an example gas collection cell.
Figure 3:
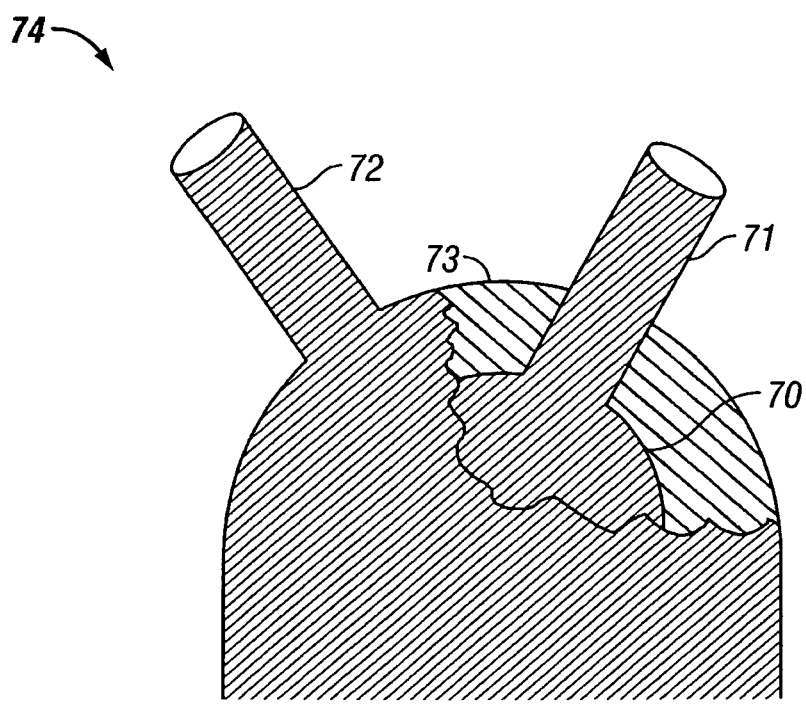
FIG. 3 represents a cut-away illustration of the example gas collection cell illustrated in FIG. 2.

Referring now to FIGS. 2 and 3, the Figures present a first and second view of an illustrative example of a gas collection cell 74. Inner vessel 70 is disposed within outer vessel 73. Inner gas outlet 71 exits inner vessel 70, travels through outer space 75 and exits through the surface of outer vessel 73. In various examples, the walls of the inner gas outlet 71 may be reinforced in those portions likely to undergo strain during operation, such as exit location from the inner vessel 70 and the exit location from outer vessel 73. In further examples, the walls of outer vessel 73 might be reinforced in the area surrounding the exit of inner gas outlet 71. As illustrated, the inner and outer vessels may be substantially cylindrical with dome shaped top portions. However, one of ordinary skill in the art would recognize that the vessels may comprise other shapes without departing from the scope of the invention.

Figure 4:
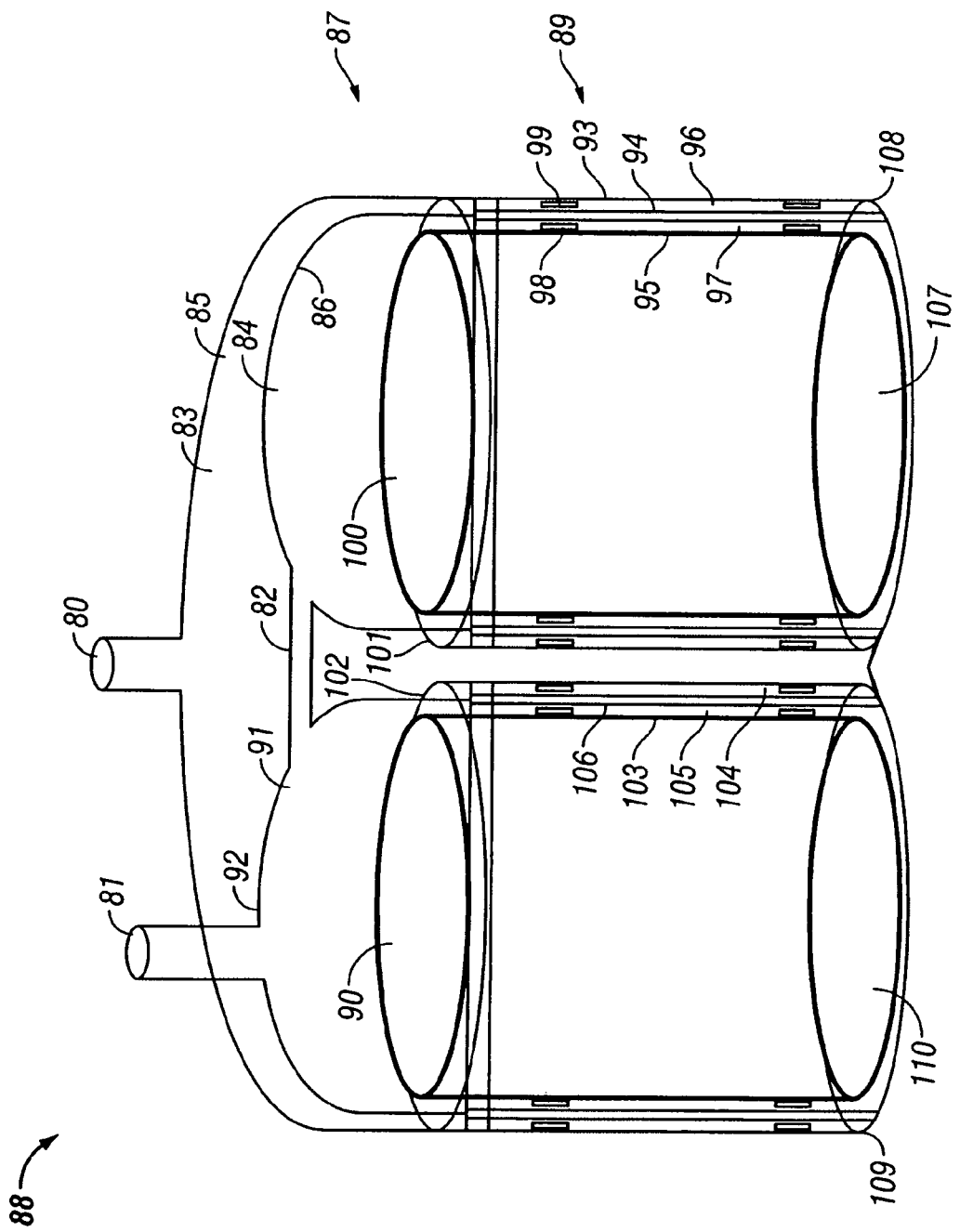
FIG. 4 illustrates a gas collection apparatus comprising two joined gas collection cells.

Referring now to FIG. 4, a gas collection apparatus 88 may comprise a plurality of gas collection cells, 110 and 107. In this example, inner connector 82 allows for the transfer of gasses between inner capture spaces 91 and 84. The inner connector 82 is disposed on the inner capture members 92 and 86 and, in this example, forms a tube which connects the inner capture spaces 91 and 84. In various examples, inner connector 82 may be composed of a variety of materials, including without limitation: acrylics, metals, polycarbonates, ceramics, and plastics. Inner connector 82 may be formed or molded with the inner capture members as one continuous component. Or, inner connector 82 may be inserted and welded or joined to the inner capture members. Gasses formed in inner separation spaces 105 and 97 disposed between the membranes 106 and 94 and the inner vessels 103 and 95, respectively, accumulate in the capture spaces 91 and 84 and may transfer among the spaces by way of the inner connector 82. Inner outlet port 81 allows for the release of gasses accumulated in each inner capture space because of this transfer. Outer capture member 85 may be disposed substantially around outer vessels 108 and 109. Gasses produced in outer separation spaces 96 and 104 accumulate in outer capture space 83 and are accessible through outer outlet port 80.

Figure 5:
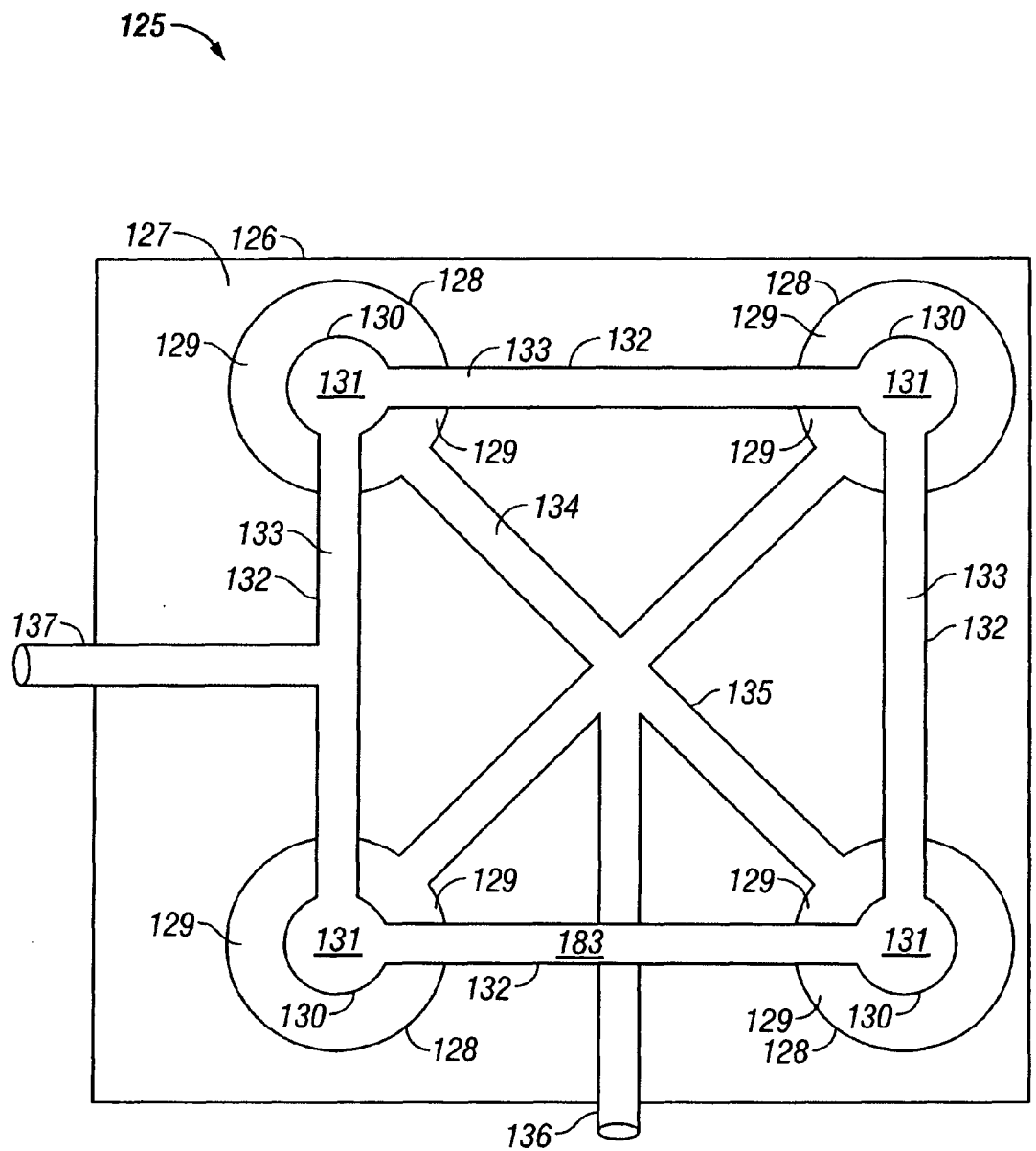
FIG. 5 illustrates a bottom up view of a gas collection apparatus comprising four joined gas collection cells.

Referring now to FIG. 5, FIG. 5 illustrates a bottom up view of an alternative example illustrating a four cell design for a gas collection apparatus. In this example, outer capture spaces 129 are disposed in the space formed between outer capture members 128 and inner capture members 130. Outer capture spaces 129 are joined by outer connection spaces 134 which are formed by outer connectors 135. In this example, outer gas outlet 136 is joined to outer connector 135 and allows access to gasses contained in the outer capture spaces and the outer connection spaces. In this example, inner capture spaces 131 are disposed in the space formed by the inside of the perimeter of the inner capture members 130. The inner capture spaces are joined by the inner connection spaces 133, formed by the inner connectors 132. Gas accumulated in the inner connection spaces and inner connector spaces is accessible through the inner gas outlet 137. In various examples, the space 127 formed between the outer apparatus wall 126 and the outer capture members 128 may be filled with a material. In these examples, connectors 132 and 135, and outlets 136 and 137 will be tunnels through the material. For example, without limitation, the material may be composed of a polycarbonate plastic. In other examples, the space 127 may be empty space, in which case, the connectors 132 and 135, and outlets 136 and 137 may be tubes or pipes. These tubes or pipes may be composed of various materials, such as metals or polycarbonates. Those of ordinary skill in the art would recognize other possible multi-cell configurations and compositions for the apparatus without departing from the scope of the invention.

Figure 6:
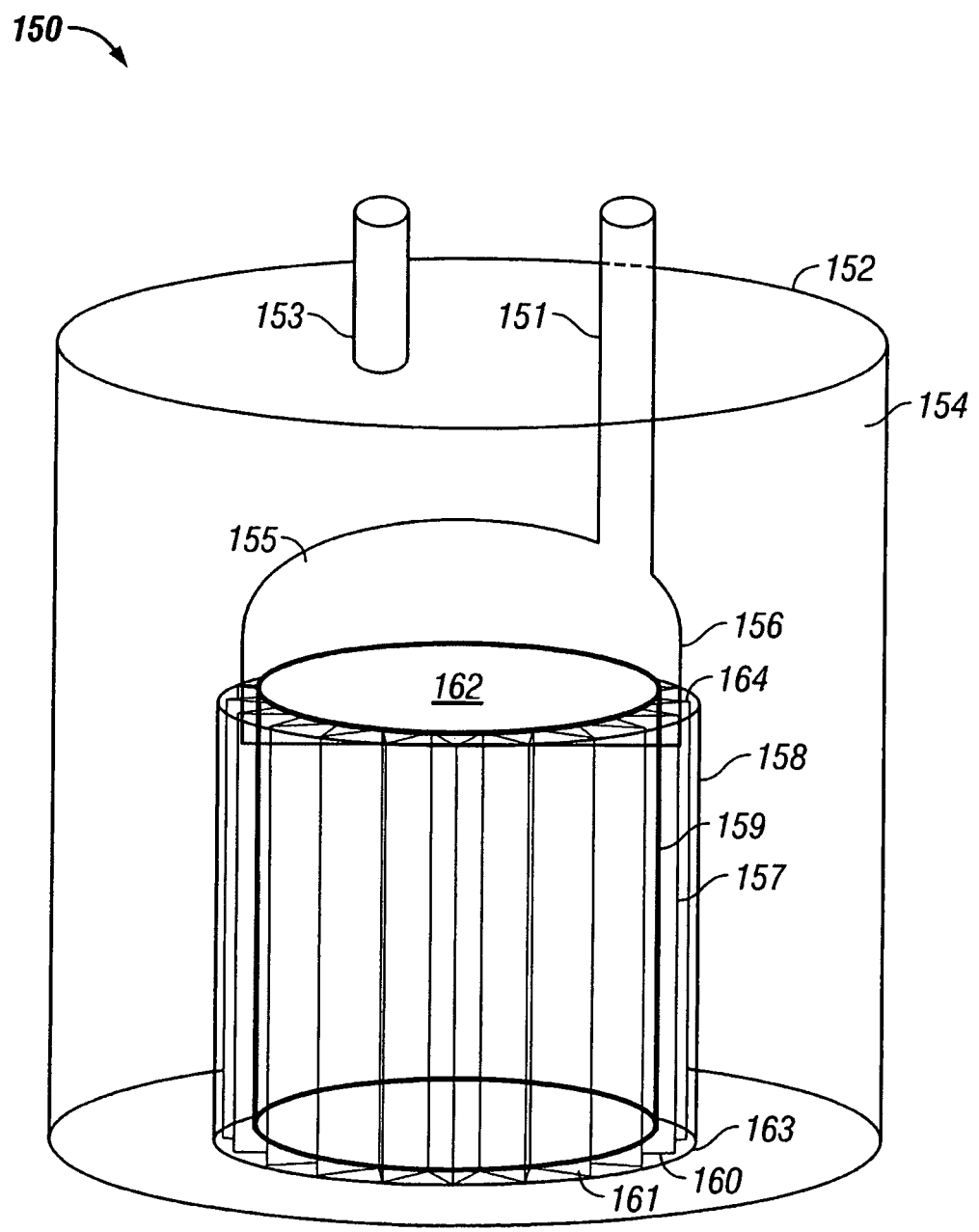
FIG. 6 illustrates an alternative example gas collection cell.

Referring now to FIG. 6, FIG. 6 illustrates an alternative example of a gas collection cell 150. Gas collection cell 150 comprises an outer capture member 152 disposed substantially around an inner capture member 162. The outer capture member 152 forms an outer capture space 154. In various examples, the outer capture space 154 may also serve as a reservoir for electrolysis liquid. In these examples, gas formed in outer separation spaces 160 accumulates above the surface of the liquid at the top of outer capture space 154. For example, without limitation, outer capture member may be composed of: a polycarbonate, a metal, a plastic, or a ceramic. Inner capture member comprises a cap 156, an outer electrode 158, a membrane 157, and an inner electrode 159. In various examples, the inner electrode and outer electrode are formed into substantially concentric cylinders. The inner and outer electrode are chargeable, and may be composed of a conductor such as a metal. Or, in other examples, they may be composed of a nonconductive substance and be coated with conductive substance, such as a polycarbonate plastic coated with a conductive metal film. In further examples, they may be substantially nonconductive and contain only a conductive portion.

Referring still to FIG. 6, the membrane 157 is an impermeable non-conductive membrane disposed between the inner and outer vessels. The membrane 157 is formed into an saw-toothed surface 164 which is wrapped around the inner electrode. This formation creates a series of inner spaces 161 and outer spaces 160. The inner spaces 161 are those spaces with boundaries created by the outer surface of the inner electrode and the inner surface of the membrane. The outer spaces 160 are those with boundaries created by the inner surface of the outer electrode and the outer surface of the membrane. In various examples, the height of the saw teeth span the distance between the inner and outer electrodes. In these examples, the membrane is kept positionally stable without the use of separators because the teeth of the saw-toothed formation all have substantially the same height and width. Those of ordinary skill in the art would recognize other configurations of the membrane without departing from the scope of the invention. For example, the separator could be substantially sinusoidal instead of saw-toothed.

Referring still to FIG. 6, the cap 156 is configured to collect gas electrolytically formed in the inner spaces 161. In various examples, the bottom rim of the cap 156 is saw-toothed to maintain a seal between the cap 156 and the membrane 157. In other examples, the cap is substantially cylindrical and the top portion of the membrane transitions into a circular shape to maintain a seal between the cap and the membrane. Those of ordinary skill in the art would understand various other seal and cap configurations that allow the capture of gasses electrolytically formed at the surface of the inner electrode without departing from the scope of the invention.

In the examples described above, gas formed in the inner spaces 161 is captured in the cap 157 by virtue of the seal between the cap and the membrane 157. Gas formed in the outer spaces 160 is captured by the outer capture member 152. An outer gas outlet 153 disposed on the outer capture member 152 allows access to the captured gas. An inner gas outlet 151 is disposed on the cap 155 and travels through the outer capture space 154 and exits through the outer capture member 152. The inner gas outlet 151 allows access to the gas captured in the space formed by the cap 156.

Figure 7:
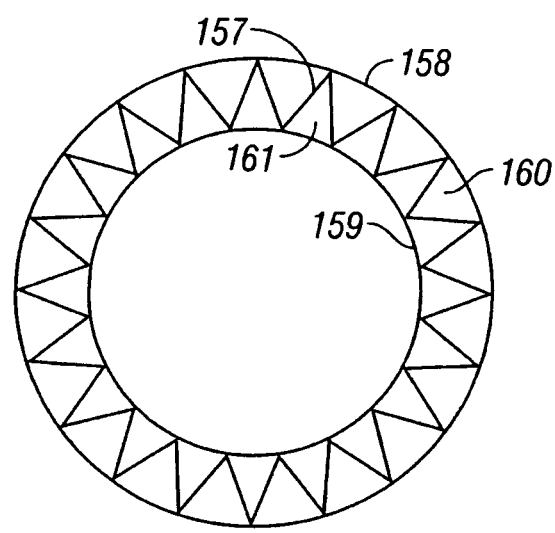
FIG. 7 illustrates a bottom up view of the example of FIG. 6.

Referring now to FIG. 7, FIG. 7 represents a bottom up view of the example illustrated in FIG. 6 to illustrate the saw-toothed shape of the example membrane 157. Inner spaces 161 are formed by the boundaries of the inner surface of the membrane 157 and the outer surface of the inner electrode 159. Outer spaces 160 are formed by the boundaries of the outer surface of the membrane 157 and the inner surface of the outer electrode 158. Again, one of ordinary skill in the art would recognize other membrane shapes without departing from the scope of the invention.

Figure 8A:
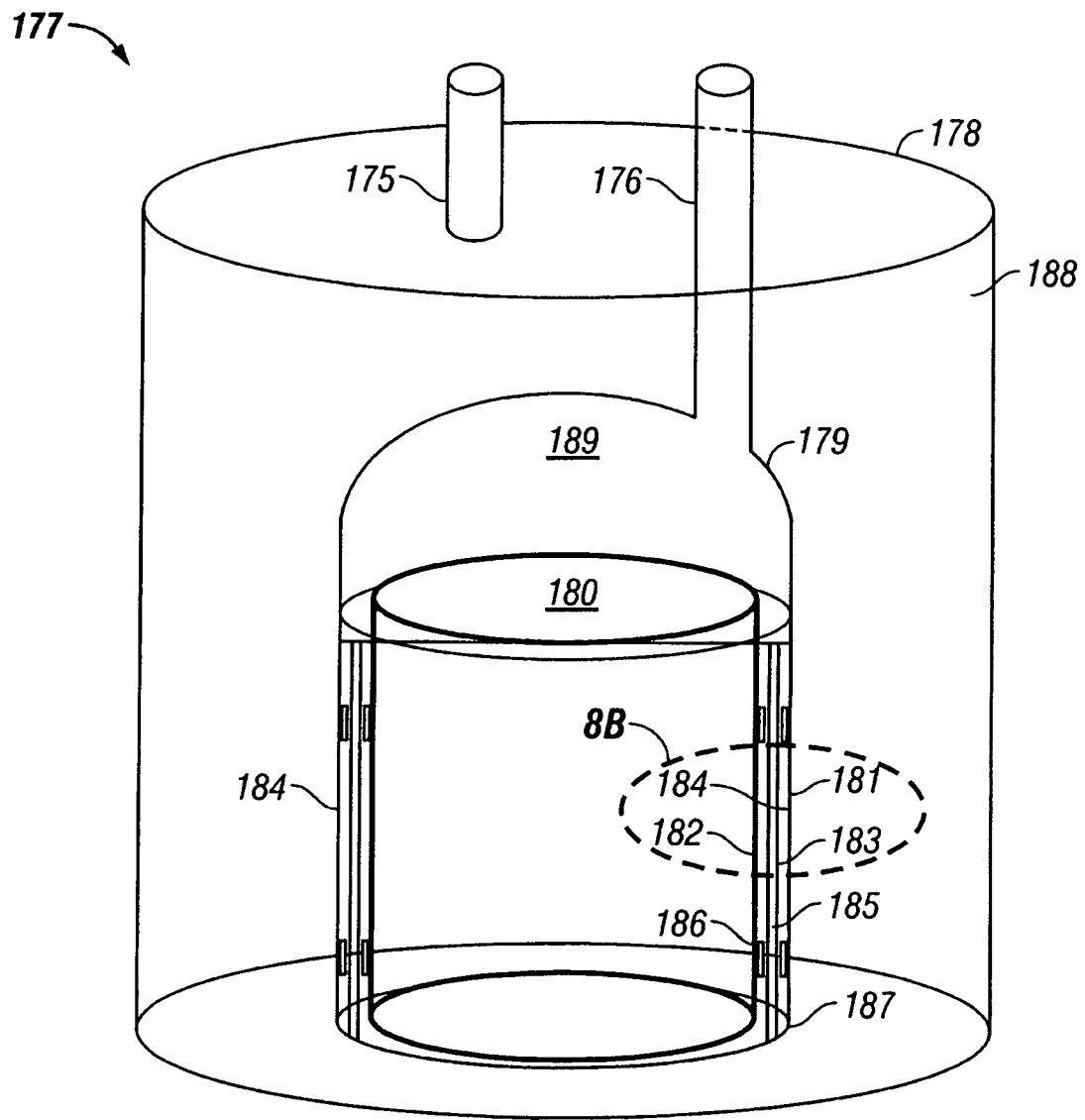
FIG. 8A illustrates an alternative example gas collection cell.
Figure 8B:
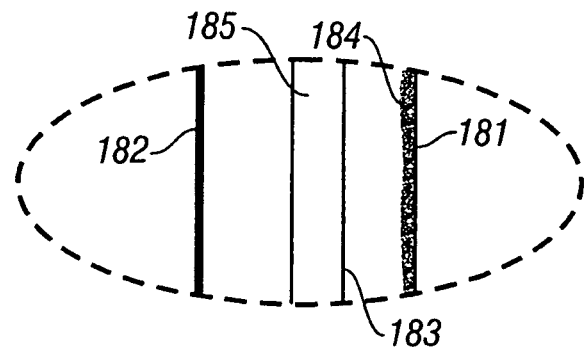
FIG. 8B is a close-up of the area indicated as 8B shown in FIG. 8A.

Referring now to FIGS. 8A and 8B, FIG. 8 represents an alternative example of a gas collection cell 178. In this example, outer capture member 178 is disposed substantially around inner capture member 180. The inner surface of outer vessel 181 is coated with an impermeable, nonconductive material 184. For example, the coating may be a polymer coating such as a polyurethane or other like coating. The inner vessel 182, membrane 183 and separators 186 are as described above. As discussed above, the bottom portions of the vessels allow for fluid communication between the surfaces of the vessels to allow current to flow between the vessels during electrolysis. The coating 184 prevents the electrolytic formation of a gas on the inner surface of the outer vessel 181 when the outer and inner vessels are charged for electrolysis. When the vessels are charged for electrolysis, a first gas forms on the outer surface of the outer vessel 181 and is contained in outer capture space 188 formed by the outer capture member 178. A second gas forms on the outer and inner surfaces of the inner vessel 182 and is contained in inner capture space 189 formed by the cap 179. Outer gas outlet 175 is disposed on the surface of outer capture member 178 and allows access to the gas contained in outer capture space 188. Inner gas outlet 176 is disposed on the surface of cap 179, travels through outer capture space 188 and exits through the surface of outer capture member 178. Inner gas outlet 176 allows access to the gas contained in inner capture space 189. In this example, because gas does not form at the inner surface of outer vessel 181, the lower rim of cap 179 may be sealed to the upper rim of outer vessel 181. Therefore, in this example, the separators 186 and membranes 183 may be eliminated entirely yet still allow for the uncontaminated collection of gaseous by-products of electrolysis.

Figure 9A:
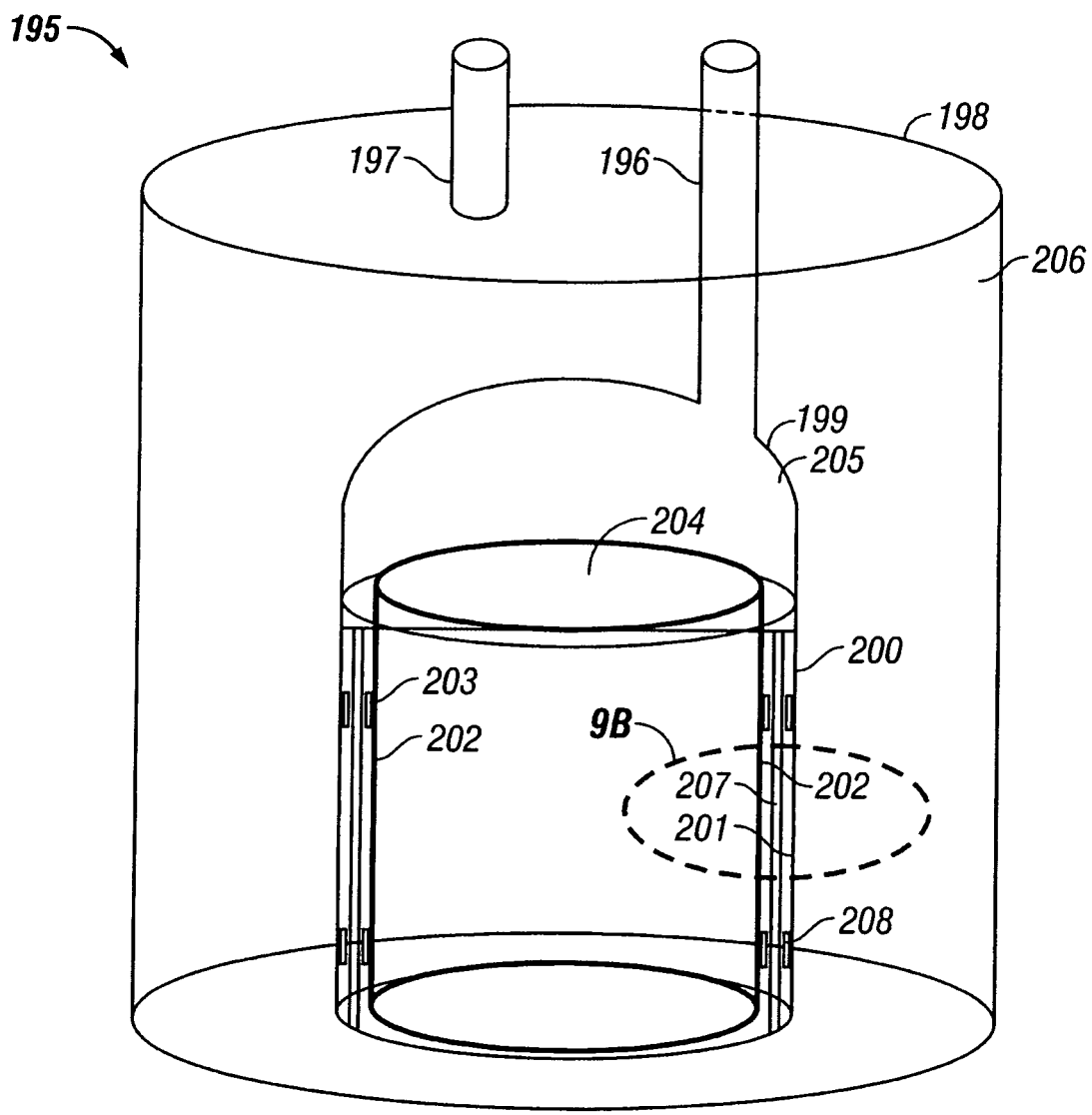
FIG. 9A illustrates an alternative example gas collection cell.
Figure 9B:
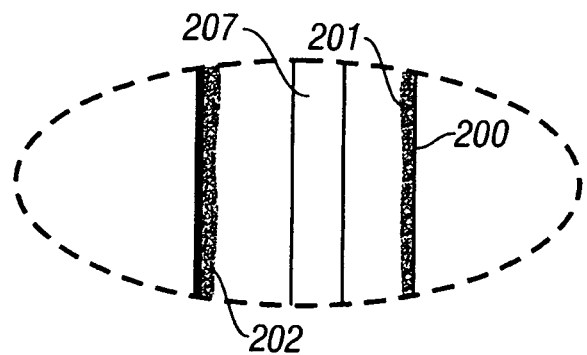
FIG. 9B is a close-up of the area indicated as 9B shown in FIG. 9A.

Referring now to FIGS. 9A and 9B, FIG. 9 illustrates a further alternative example of a gas collection cell 195. In this example, outer capture member 198 is disposed substantially around inner capture member 204. The inner surface of outer vessel 200 is coated with an impermeable, nonconductive material 201. The outer surface of the inner vessel 203 is coated with an impermeable, nonconductive material 202. For example, the coatings may be polymer coatings such as polyurethane coatings. The membrane 183 and separators 186 are as described above. As discussed above, bottom portions of the vessels allow for fluid communication between the surfaces of the vessels to allow current to flow between the vessels during electrolysis. The coating 201 prevents the electrolytic formation of a gas at the inner surface of the outer vessel 200 when the outer and inner vessels are charged for electrolysis. The coating 202 prevents the electrolytic formation of a gas at the outer surface of the inner vessel 203 when the outer and inner vessels are charged for electrolysis. When the vessels are charged for electrolysis, a first gas forms on the outer surface of the outer vessel 200 and is contained in outer capture space 206 formed by the outer capture member 198. A second gas forms on the inner surface of the inner vessel 203 and is contained in inner capture space 205 formed by the cap 199. Outer gas outlet 197 is disposed on the surface of outer capture member 196 and allows access to the gas contained in outer capture space 206. Inner gas outlet 196 is disposed on the surface of cap 199, travels through outer capture space 206, and exits through the surface of outer capture member 198. Inner gas outlet 196 allows access to the gas contained in inner capture space 205. In this example, because gas does not form at the inner surface of outer vessel 200, the lower rim of cap 199 may be sealed to the upper rim of outer vessel 200. Alternatively, in this example, because gas does not form at the outer surface of the inner vessel 203, the lower rim of cap 199 may be sealed to the upper rim of inner vessel 203. Therefore, in this example, the separators 208 and membrane 207 may be eliminated entirely yet still allow for the uncontaminated collection of gaseous by-products of electrolysis.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples.

The invention claimed is:

1. A gas collection device, comprising:
   an inner vessel having an open bottom and an electrically conductive surface portion for allowing the electrolytic formation of the first gas;
   an outer vessel having an open bottom and an electrically conductive surface portion for allowing the electrolytic formation of a second gas;
   a capture member for capturing one of the formed gases; and
   a membrane between the inner vessel and the outer vessel, wherein the inner vessel is disposed substantially within the outer vessel, wherein both vessels are configured to allow a continuous fluid body to come into contact with the conductive surface portions, wherein the capture member allows the capture of one of the formed gases without substantial contamination from the other formed gas, and wherein the membrane is composed entirely of a gas-impermeable and nonconductive material, wherein the nonconductive material prevents the membrane from receiving an induced charge.

2. The gas collection device of claim 1, wherein the capture member is joined with the membrane and allows the capture of the first gas.

3. The gas collection device of claim 1, further comprising a second capture member disposed on the outer vessel for capturing the second gas.

4. The gas collection device of claim 1, further comprising a plurality of impermeable, non-conductive separators disposed on an inner surface of the outer vessel and on an outer surface of the inner vessel, and wherein the membrane is disposed between the impermeable, non-conductive separators disposed on the inner surface and the impermeable, non-conductive separators disposed on the outer surface.

5. The gas collection device of claim 1, wherein the membrane is formed into a surface with a substantially periodic cross section to maintain positional stability, wherein the substantially periodic cross section is selected from the group consisting of a sinusoidal profile and a saw-tooth profile.

6. The gas collection device of claim 1, further comprising a second capture member disposed substantially around the outer vessel, the second capture member allowing for the capture of the second gas.

7. The gas collection device of claim 1, wherein the capture member is disposed substantially around the outer vessel and allows for the capture of the second gas.

8. A method for containing gas, comprising;
   Electrically charging an electrically conductive surface portion of an inner vessel disposed substantially within an outer vessel to allow the electrolytic formation of a first gas, wherein the inner vessel and the outer vessel each have an open bottom;
   electrically charging an electrically conductive surface portion of the outer vessel to allow the electrolytic formation of a second gas;
   capturing on of the formed gases within a capture membrane, wherein a membrane is disposed within the inner vessel and the outer vessel, and wherein the membrane is composed of entirely of a gas-impermeable and nonconductive material, wherein the nonconductive material prevents the membrane from receiving an induced charge.

9. The method of claim 8, wherein the capture member is joined with the membrane and captures the first gas.

10. The method of claim 8, further comprising the capturing of the second gas in a second capture member disposed on the outer vessel.

11. The method of claim 8, further comprising the capturing of the second gas in a second capture member disposed substantially around the outer vessel.

12. The method of claim 8, wherein a plurality or impermeable, nonconductive separators is disposed on an inner surface of the outer vessel and an outer surface of the inner vessel, and wherein the membrane is disposed between the impermeable, nonconductive separators disposed on the inner surface and the impermeable, nonconductive separators disposed on the outer surface.

13. The method of claim 8, wherein the membrane is formed into a surface with a substantially periodic cross section for maintaining positional stability, wherein the periodic cross-section is selected from the group consisting of a sinusoidal profile and a saw-tooth profile.

14. The method of claim 8, further comprising capturing the second gas in the capture member, and wherein the capture member is joined with the outer vessel.

15. The method of claim 8, further comprising capturing the second gas in the capture member, and wherein the capture member is disposed substantially around the outer vessel.

16. A gas collection device, consisting essentially of:
    a bottomless inner vessel having an electrically conductive surface for allowing the electrolytic formation of a first gas;
    a bottomless outer vessel having an electrically conductive surface for allowing the electrolytic formation of a second gas;
    a capture member for capturing one of the formed gases, wherein the inner vessel is disposed substantially within the outer vessel, wherein the outer vessel and the inner vessel are configured to allow continuous fluid bodies to contact the inner and outer vessels; and
    an impermeable and nonconductive membrane, the membrane being disposed between the inner and outer vessels, wherein the outer vessels, wherein the capture member is joined with the membrane and allows the capture of the first gas, wherein the nonconductive material prevents the membrane from receiving an induced charge.

17. The gas collection device of claim 16, further consisting essentially of: a second capture member for capturing a second gas, and wherein the second capture member is connected to the bottomless outer vessel.

18. The gas collection device of claim 16, wherein the membrane is formed into a surface to maintain positional stability.

19. The gas collection device of claim 16, further consisting essentially of a plurality of inner vessels, a plurality of outer vessels, and a plurality of impermeable and non-conductive membranes, one inner vessel being substantially disposed within one outer vessel to form a vessel pair, each membrane being disposed in between a corresponding inner vessel and outer vessel of each vessel pair.

20. The gas collection device of claim 19, further consisting essentially of a plurality of second capture members, wherein the second capture members are coupled to allow transfer of the second gas among the second capture members.

21. The gas collection device of claim 19, further consisting essentially of a second capture member, wherein the second capture member is connected to the outer vessel to capture the second gas.

22. The gas collection device of claim 21, further consisting essentially of a plurality of inner capture members for capturing the first gas, the plurality of inner capture members joined to allow the transfer of the first gas among the plurality of inner capture members.

\* \* \* \* \*